May 28, 1963 M. C. AUBERT 3,091,400

DISH-WASHING MACHINE HAVING A ROTARY WOBBLE SPRAYING APPARATUS DRIVEN BY A MOMENT OF MOMENTUM

Filed March 9, 1962

INVENTOR
MICHEL AUBERT

BY
AGENT 3,091,400
Patented May 28, 1963

3,091,400

DISH-WASHING MACHINE HAVING A ROTARY WOBBLE SPRAYING APPARATUS DRIVEN BY A MOMENT OF MOMENTUM

Michel Claude Aubert, Geneva, Switzerland, assignor to Frame S.A., Freiburg, Switzerland Filed Mar. 9, 1962, Ser. No. 178,690
3 Claims. (Cl. 239—261)

Dish-washing machines are known in several forms, especially of the type having a rotary spraying apparatus driven by a moment of momentum. In a known embodiment, U.S. Patent 2,967,024, the spraying apparatus comprises a wobbling spraying body, substantially cylindrical in shape having a spraying head and spraying apertures provided therein, which apertures bring about inter alia a moment of momentum for the rotational movement of the spraying body. At its lower side, the spraying body has a substantially hemi-spherically rounded bearing piece which is placed in a conical bearing seat. For the remaining part the spraying body is supported by a ring surrounding the spraying body at a certain distance and on which the said body rolls during rotation. Wash liquid is supplied under pressure to the spraying apparatus by means of a pump. The spraying body has an axial supply conduit which communicates through a distribution chamber with the spray apertures of the spraying head, said conduit also extending through the bearing piece and the conical bearing seat.

However, the known embodiment of such wobble spraying apparatus is unsatisfactory from a structural viewpoint. Thus, there is a risk that impurities may settle in the basket or pot supporting the ring. To remove such impurities, the spraying body has to be lifted out of its bearing and therefore requires a diameter smaller than that of the associated ring. This constitutes a disadvantage insofar that, due to abrupt variations in the pressure of the wash-liquid supplied to the spraying apparatus, especially upon turning on the machine, there is a risk that the spraying body may be lifted out of its bearing and, in certain cases, even swept into the container of the dish-washing machine. An object of the invention is to obviate this disadvantage.

The present invention relates to a dish-washing machine having a rotary wobble spraying apparatus driven by a moment of momentum, comprising a spraying body having a spraying head and a bearing piece, together with a ring surrounding it.

The present invention consists in that the bearing piece has an internal conical bearing seat and is placed by means thereof on a piece of pipe intended for the supply of wash liquid under pressure, the edge of which has been rounded to form a bearing seat, the bearing piece having a collar pulled down over the piece of pipe and an adjoining, outwardly projecting shoulder the lower side of which engages the ring and rolls on it. In one preferred embodiment, the external diameter of the spraying body is chosen so that the body just does not contact the ring. The ring itself has a diameter preferably smaller than that of the projecting shoulder on the bearing piece of the spraying body, it being possible for the ring to be constituted by the inwardly-flanged edge of the aperture of an annular disc secured in a detachable manner to a frame fixed to the piece of supply pipe. The spraying body itself may fundamentally be constructed in different ways. It is preferable for the spraying body to be built up from the said bearing piece, an annular piece placed on it and constituting the distribution chamber, and a spraying head formed as a cover for the distribution chamber. The wall thicknesses and the choice of the materials of the individual elements have to be such that a sufficiently firm seat of the bearing parts of the spraying body on the associated piece of supply pipe is ensured and that the moment exerted by gravity is sufficient to move the spraying body along the ring.

The advantages obtained by the invention must especially be seen in that, in a dish-washing machine according to the invention, the spraying body of the wobble spraying head cannot be lifted from its bearing neither upon switching on the machine, nor upon variations in the pressure of the wash-liquid. Besides, the device as a whole is so constructed that, due to the narrow annular gap which remains between the spraying body and the ring, impurities cannot penetrate the space below the ring. Nevertheless, the spraying body may readily be removed since the ring itself is readily removable.

In order that the invention may be readily carried into effect, one embodiment thereof will now be described in detail, by way of example, with reference to the accompanying diagrammatic drawing, in which—

Figure 1:
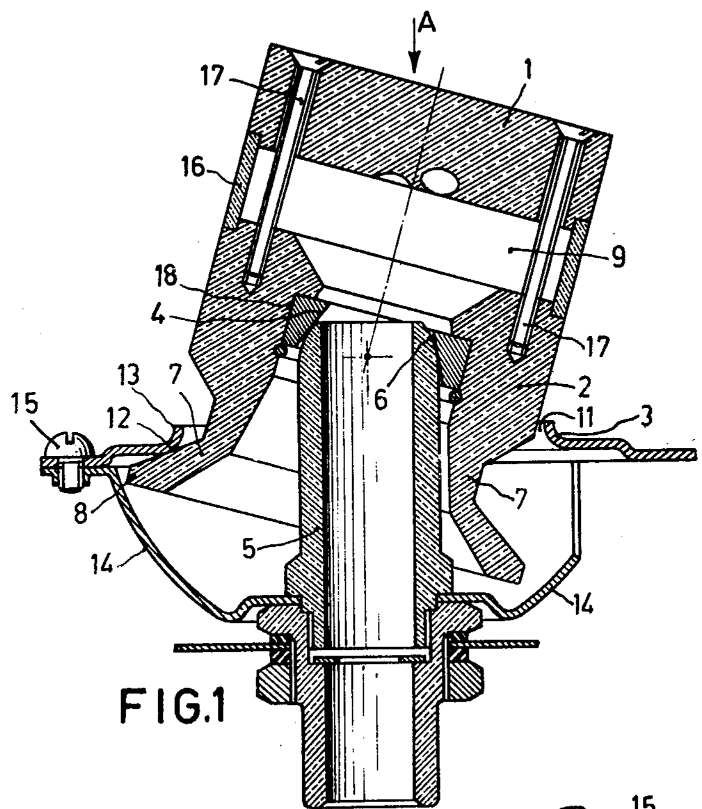
FIGURE 1 is an elevated cross sectional view through the wobble spraying apparatus of a dish-washing machine according to the invention.
Figure 2:
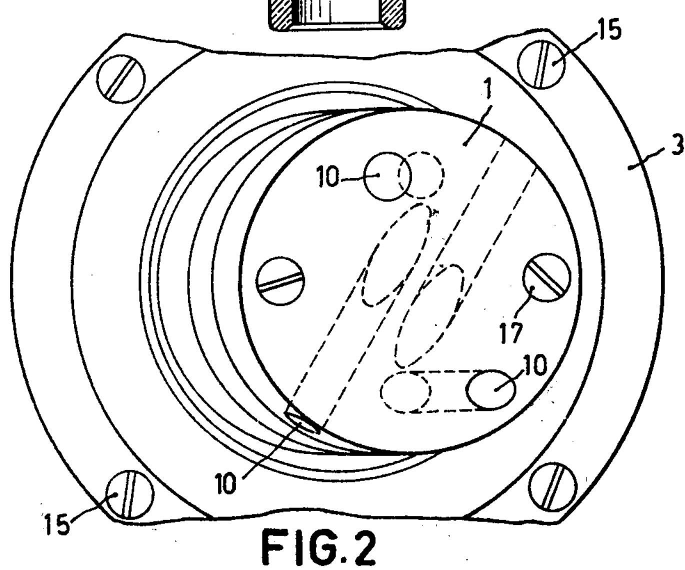
FIGURE 2 is a plan view of the apparatus of FIGURE 1, viewed in the direction indicated by arrow A.

Of the dish-washing machine according to the invention, only the rotary wobble spraying apparatus driven by a moment of momentum is shown. The wobble spraying apparatus comprises body piece 2, having a spraying head 1 attached thereto, and a ring 3 surrounding it. The body piece 2 has an internal conical bearing seat 4 and is placed, by means thereof, on a piece of pipe 5 for the supply of wash-liquid under pressure, which may be considered as forming part of the wobble spraying apparatus, and the edge of which is rounded to form a bearing seat 6. The extending piece 2 has a collar 7 pulled down over the said supply pipe 5 and an adjoining, outwardly projecting shoulder 8 which engages the lower side of ring 3 and rolls on it when wash-liquid is supplied under pressure. This liquid is supplied through the said piece of pipe 5 in any suitable manner (as indicated in FIG. 1), then enters a distribution chamber 9 and emerges through spraying apertures 10 (FIG. 2) of spraying head 1. The orientation of the apertures 10, as may be seen from FIGURE 2, is chosen so that a moment of momentum sets the spraying body rotation, whereby body 2 rolls on the ring 3. The external diameter of the body piece 2 is chosen so that it does not contact the ring 3, that is to say a small or narrow gap exists at the area 11. The rolling proper thus takes place on the projecting shoulder 8; the contact area between shoulder 8 and ring 3 is indicated at 12 in FIGURE 1. The ring 3 has a diameter smaller than that of the projecting shoulder 8. The ring 3 itself is formed by a flanged edge 13 of the inner aperture of an annular disc secured in a detachable manner to a frame 14 fixed to the piece of supply pipe 5. To remove the annular disc, it is necessary only to untighten a fastening screw 15. In addition to the body piece 2 the spraying apparatus comprises an annular piece 16 secured on body piece 2, which constitutes a distribution chamber 9, and a spraying head 1 formed as a cover for the distribution chamber 9. Long screws 17 maintain the spraying head 1 and the bearing piece 2, supported by the annular piece 16, in engagement.

What is claimed is:

1. A rotary wobble spraying device for dish washer apparatus comprising a generally cup shaped base member having a radially inwardly extending ring portion at the open end thereof, an axially extending conduit secured to said base member at one end and projecting beyond said ring member, a bearing seat at the other end of said conduit, a hollow body member overlying said conduit having an elongated inwardly converging bore receiving said conduit, a bearing seat in said bore operatively associated with the bearing seat of said conduit, an annular recess in the exterior surface of said body member for receiving said ring portion and an outwardly flared skirt subtending said body member for engaging the underside of said ring portion, the outside diameter of said body member and the inside diameter of said ring portion being unequal for providing a narrow gap therebetween during operation of said body member, and means supported on said base member having inclined apertures for ejecting wash liquid and rotating said body member.

2. Spraying apparatus for a dish washing machine of the rotary wobble type comprising a base member having a longitudinally extending supply pipe extending therethrough and projecting beyond said base member, means for securing said base member to one end of said pipe, an elongated body member having a longitudinally extending inwardly converging bore receiving said supply pipe, means defining a bearing seat adjacent one end of said bore engaging a bearing seat on one end of said pipe; said body member having an exterior annular recess axially spaced from said bearing seats defining a subtending collar portion and a radially outwardly flaring subtending skirt portion having an outside diameter greater than the outside diameter of the remainder of said body member, said skirt portion being normally located within said base member, said base member having a radially inwardly projecting removable ring receivable within said recess during operation of said apparatus, the inside diameter of said ring being substantially less than the outside diameter of said skirt portion of said body member and greater than the outside diameter of the upper portion of said body member for providing a narrow gap therebetween during wobble movement of said body member relative to said ring, means supported on said body member remote from said skirt portion defining a distribution chamber in communication with the bore of said body member and a spraying head having inclined apertures therethrough opening into said distribution chamber.

3. Spraying apparatus according to claim 2 wherein said ring comprises an annular disk having a flanged edge defining the inside diameter of said ring, said flanged edge being directed toward the spraying head of said apparatus.

References Cited in the file of this patent

UNITED STATES PATENTS

| | | |
|---|---|---|
| 2,967,024 | Aubert | Jan. 3, 1961 |

FOREIGN PATENTS

| | | |
|---|---|---|
| 719,424 | Germany | Apr. 8, 1942 |
| 903,592 | France | Jan. 22, 1945 |